May 31, 1932.　　　J. J. NAUGLE　　　1,860,944
METHOD OF TREATING LIQUIDS
Filed May 3, 1926
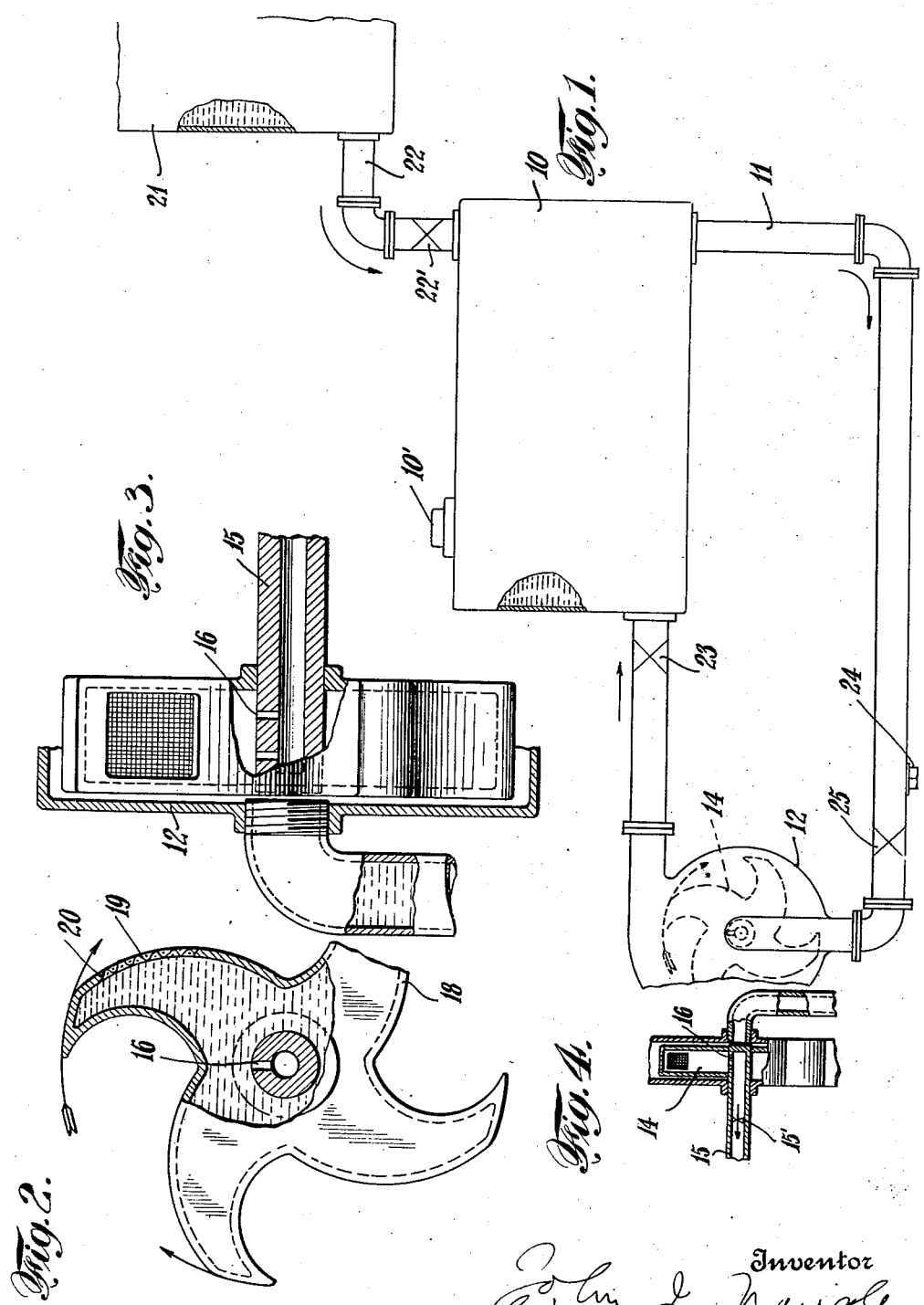

Patented May 31, 1932

1,860,944

UNITED STATES PATENT OFFICE

JOHN J. NAUGLE, OF BROOKLYN, NEW YORK

METHOD OF TREATING LIQUIDS

Substitute for application Serial No. 574,868, filed July 14, 1922. This application filed May 3, 1926.
Serial No. 106,379.

My present invention relates to methods of treating liquids, such as sugar melts, syrups, molasses, vegetable and other oils, and other liquids containing, for example, colloidal or other impurities which it is desired to remove in an efficient and inexpensive manner. While not limited thereto, the method of the present invention finds particularly successful application in the treatment of liquids of the general character specified above, containing adsorbable material, such as adsorbable coloring and odoriferous substances, which it is desired to remove by the use of a suitable adsorbent, such as an activated or other carbon, or other equivalent material.

It is an object of the present invention to devise a method of the character specified above, which, when used for the purpose of purifying liquids, such as sugar melts, syrups, molasses, vegetable and other oils, and other liquids containing adsorbable material, by means of a suitable adsorbent, such as an activated or other carbon, or equivalent material, will enable the adsorbent to be used in such a way as to give it the maximum efficiency for purification, to bring about as intimate a contact as possible between the adsorbent and the materials desired to be removed by adsorption, and to handle the adsorbent material in such a way that the efficiency of the individual particles or adsorbent material is kept as high as possible, and the particles themselves kept as active and as efficient as possible.

It is another object of the present invention to devise such a method of treating liquids containing adsorbable material with a suitable adsorbent, in order to remove the adsorbable material, that the purified liquid may be removed from the adsorbent and that portion of the liquid which is as yet unpurified, at as high a rate as possible. It is a further object of the present invention to devise a method which can be practiced with the maximum economy of space and cost of equipment, and which shall yield a uniformly high-grade of filtrate. In particular, by the use of the method of the present invention, sugar may be obtained from sugar melts of such a high degree of purity and possessing such a high degree of whiteness and freedom from discoloration as to command an exceptionally high price in the market. Similarly, low grades of molasses may be treated in accordance with the method of the present invention to obtain a commercially valuable syrup in such a simple and expeditious manner as to make what was previously a worthless and unsalable product a product having great commercial value.

In the accompanying specification I shall describe, and in the annexed drawings, show a preferred embodiment of the method of the present invention, together with one of the many forms of apparatus which may be used for practicing such a method. It is, however, to be clearly understood that my invention is not limited to the specific embodiments thereof herein shown and described for purposes of illustration only.

Referring to the drawings wherein I have more or less diagrammatically illustrated one form of apparatus in which the herein described embodiment of the method of the present invention may be practiced, Fig. 1 is a diagrammatic view showing such apparatus as a whole and indicating the course of the liquid to be purified, through the apparatus;

Figure 2 is a detailed view, on an enlarged scale, of a combined impelling and filtering element forming one of the essential features of the apparatus referred to;

Figure 3 is a view, partly in longitudinal section and partly in side elevation, of said combined impelling and filtering element; and Figure 4 is a view partly in longitudinal and cross sections, and partly in side elevation, of said combined impelling and filtering element.

Referring to the herein described embodiment of the method of the present invention, the same comprises, briefly, first, the step of circulating a mixture of liquid to be purified and containing adsorbable material such as a sugar melt containing adsorbable colloidal or other impurities given the same undesirable color and odor, with a suitable adsorbent material, such as an activated carbon, While various grades and types of activated carbons may be used for this purpose, I prefer to use the decolorizing carbon known to the trade as "Suchar", since I find that this carbon possesses many advantages and superiorities for the desired purpose, and combines admirably with the present process in effecting many and substantial economies and in producing a very superior final product.

In adding the adsorbent material, such as the activated carbon, to the liquid to be purified, I prefer to add the entire amount of carbon which is to be used to the point of exhaustion to a fraction only of the liquid to be treated. That is, if I am to purify, say, 200,000 pounds of sugar melt which would require, say, 200 pounds of "Suchar" for its purification and assuming that the circulation system, subsequently described in greater detail, can contain 10,000 pounds of sugar melt, I add the total amount of 200 pounds of adsorbent, such as the activated carbon, directly to the 10,000 pounds of sugar melt, or its equivalent, present in the circulation system.

This feature of the present method is of great importance since it brings into intimate contact with a fraction only of the liquid to be treated, the entire amount of activated carbon or its equivalent intended to treat the entire amount of liquid. In this way there is brought about a great increase in efficiency and a much more rapid and much more efficient purification of the liquid being treated.

The liquid and the adsorbent contained therein are circulated in what amounts practically to a substantially closed pressure system, comprising a circulation or re-agent tank, to which a fraction of the liquid and the entire amount of the carbon are initially added, this tank being indicated by reference character 10; an outlet pipe 11, leading to an agitating chamber 12; and an inlet pipe 13, leading from the agitating chamber back to the circulation or re-agent tank 10.

Within the agitating chamber 12 is a combined impelling and filtering member 14, which may now be described in some detail. The combined impelling and agitating member 14 is rotatably carried by a hollow shaft 15 having openings 16 communicating with the interior of the member 14, this member being hollow, as clearly shown in Figures 2, 3, and 4 of the drawings. One end of the hollow shaft 15 is closed, as indicated at 17, but the other end is open for the exit of purified liquid, which may be received by any suitable storage tank not here deemed necessary to be shown. Any suitable means, such as a belt and pulley driven from any suitable source of power, and not here deemed necessary to be shown, may be used for driving the hollow shaft 15 carrying the member 14.

The member 14 comprises a plurality of blades or equivalent members 18 which may be given the shape shown in Figures 1 and 2 of the drawings. The member 14 is preferably driven in the direction of the arrows shown in Figures 1 and 2 of the drawings. On the front face of each of the blades 18 the member 14 is preferably provided with a plurality of filtering screens 19, which are preferably made of a fine mesh metal screen made of some suitable resistant material, such as Monel metal, and which is securely fastened in place in an opening 20 in each of the blade members 18, as by welding the screen in place.

It will be noted that as the member 18 is rapidly rotated, as at a speed amounting to from about 500 to about 1500 revolutions per minute, the liquid in the system comprising the tank 10, the pipe 11, the agitating chamber 12, and the pipe 13, will be rapidly circulated and the adsorbent material carried by the liquid in the system will be brought into intimate contact with the impurities present in such liquid. At the same time that portion of the liquid in the system which is within the agitating chamber 12, comprising the shell within which the member 14 rotates, will be violently agitated. This agitation takes place to such a degree that the adsorbent material, such as the activated carbon, for example "Suchar", with the system, will be disintegrated or will have the impurities adsorbed thereby rubbed off by friction, so as to constantly provide fresh surfaces of contact for the adsorption of further quantities of adsorbable material.

Another result of this manipulation of the liquid in the circulation system, and particularly of the manner in which the portion of such liquid within the agitating chamber 12 is manipulated therein, is that the liquid within the agitating chamber 12 will be given a rotative or swirling movement which causes the liquid to effect, as by centrifugal action, a smaller concentration of adsorbent in one portion of said liquid than in another portion of the same.

The action just described results in providing a region near the center of the liquid in the agitating chamber 12, adjacent the shaft 15, which will be clearer and freer from the adsorbable material than the liquid in the outer or peripheral regions of the agitating chamber 12. Due, therefore, to the provision of the hollow shaft 15, which communicates with the interior of the agitating or disintegrating member 14, which has hitherto been referred to as the impelling or filtering member, clear liquid may be withdrawn through the hollow shaft 15 at a much higher rate of filtration than would be possible if the adsorbent material were as dense adjacent the openings 16 in the hollow shaft as it is in the outer or peripheral portions of the agitating chamber 12 within which the member 14 rotates.

In carrying out the method of the present invention, liquid, such as sugar melt, within the storage tank 21, is forced through a pipe 22 communicating with the storage or reagent tank 10, under pressure, and thus enters the substantially closed circulating system comprising the tank 10, the pipe 11, the agitating chamber 12, and the pipe 13. This pressure, resulting from the head or hydrostatic pressure due to the elevated position of the tank 21, or which may be brought about in any other suitable manner, causes the addition to the system preferably in a substantially continuous manner, of further increments of liquid to be treated. As the liquid continues to be added to the system from the tank 21 by means of the pipe 22, portions of liquid substantially free from adsorbable material are withdrawn from the system through the hollow shaft 15 which constitutes the only free outlet for the liquid pressure created in the system by the addition of further quantities of liquid from the elevated storage tank 21.

The rate of admission to the system of further increments of liquid to be treated, should be so chosen with respect to the capacity of the circulating system, and the speed of circulation, depending upon the speed of rotation of the member 14, should be so chosen, that the adsorbent material in the system will have sufficient time to exercise the necessary purifying action to yield a filtrate of the desired degree of purity, and to utilize to the fullest extent the purifying action of the activated carbon or other adsorbent material present in the substantially closed pressure system.

The manner in which the liquid is removed in its purified condition from the system will now be described in greater detail. As the combined impelling and filtering member 14, which serves at the same time to bring about the necessary circulation of the liquid in the system and to agitate the liquid within the chamber 12 in such a manner as to provide fresh surfaces of contact in the adsorbent material for the adsorption of further quantities of impurities, rotates within the chamber 12, the following actions take place:

In the first place, the liquid in the system is rapidly circulated under the action of the member 14. In the second place that portion of the liquid which is within the chamber 12 is rapidly agitated, being given a rotative or swirling motion. The result of this motion is to cause a smaller concentration of adsorbent material near the center of the chamber 12 in the vicinity of the hollow shaft 15, and a greater concentration of such adsorbent in the outer or peripheral portions of the chamber 12.

Due to this action and due to the pressure created by the addition of further quantities of liquid under pressure from the storage tank 21, or its equivalent, liquid will pass through the filtering screens 19 into the interior of the member 14 and into the hollow shaft 15 through the openings 16. It will be noted that the screens 19 are below the peripheral regions in the chamber 12 having the greater concentration of adsorbent material. Filtrate, therefore, passes rapidly through the screens 19 and into the hollow member 14 and thus out of the system into any suitable storage tank for the reception of purified liquid. The screens 19 being within the region having the smaller concentration of adsorbent, will not be heavily coated or clogged with the carbon or other adsorbent. Furthermore, the construction of the impelling member 14 and the rapid rotation of the same combine to further reduce the mount of adsorbent which would tend to collect on the screens 19 and thus reduce the rate of filtration of liquid through the screens.

The process is continued with the substantially continuous addition, under pressure, of fresh quantities of liquid to be treated, and the substantially constant withdrawal from the system, as a result of the pressure of the added liquid to be treated, of quantities of purified liquid, until all of the liquid intended to be treated by the entire amount of carbon originally added to the fraction of liquid in the system has been completely exhausted. Thereupon the system may be flushed or washed out by passing water, or other cleaning fluid in a reverse direction through the hollow shaft 15, the valve 23 being left open and the valve 24 being closed, and the drain 25 being opened to discharge the wash waters and the carbon which will thus be entirely removed from the system. This carbon may then be revivified in the manner well known to those skilled in the art. and the revivified carbon may be found to possess an even higher degree of activity, due to the further removal of soluble materials originally present in the same, than the carbon originally possessed.

In conclusion, it may be stated that the tank 10 may be provided with any suitable inlet 10' for the admission of the original fraction of liquid and the adsorbent material contained therein. Similarly, the pipe 22 may be provided with a valve 22' for regulating the amount of liquid admitted from the storage tank 21 to the circulation system, thus regulating the degree of pressure within the system and thus the rate at which pure filtrate will be withdrawn from the system through the hollow shaft 15. The hollow shaft 15 may likewise be provided with a valve 15' for regulating the rate at which pure liquid is withdrawn from the system. The system may be provided with other valves, air inlets and like auxiliary devices for purposes and in the manner well known to those skilled in the art to which the present invention relates.

The advantages of the foregoing method are many and of great practical importance. So far as I am aware this is the first time that a filtering element has been provided in the form of an impelling member which by its rotation brings about the circulation of the liquid to be purified in a substantially closed pressure system. The importance of this feature, especially in connection with the remaining features of the invention, is obvious. The circulation of the fraction of liquid being treated, together with the entire amount of adsorbent intended to treat the entire quantity of liquid, results in a remarkably great increase in the efficiency of the carbon. The feature of agitating the liquid at one point in its circulation in such a manner as to disintegrate or otherwise produce fresh surfaces of contact in the carbon for the adsorption of further quantities of impurities present in the liquid, is another features of great importance.

The substantially continuous operation of the process by the addition to the circulation system, in a substantially continuous manner, of further quantities of liquid to be treated, while withdrawing in a substantially continuous manner portions of purified liquid, results in a substantially continuous process in which the liquid is purified with the greatest possible intimacy of contact with the greatest possible amount of adsorbent material at one time. This intimacy of contact between the adsorbent and the liquid being purified, and the increased efficiency of the adsorbent, result from the manner in which the liquid and adsorbent are manipulated, as above set forth in detail.

There results from the practice of the process described above, a filtrate, such as a purified sugar melt, of remarkable purity, which yields a product, such as sugar in the example given above, of superior grade and purity which commands a higher price in the market than the products hitherto produced for sale. At the same time this desirable result, and this superior product, are obtained by a method which possesses many salient features of economy and cheapness, in the matter of the cost of equipment, space required for plant and equipment, cost of labor, maintenance, repairs, and in the great saving resulting from the much smaller quantity of carbon needed to treat a given quantity of liquid in accordance with the present method, all these features comprising great advantages over the methods which have hitherto been used in the production of far inferior products.

Of great importance, also, is the great simplicity of the manipulation of both the liquid and the adsorbent in accordance with the present method. In place of the large number of tanks and the expensive and laborious manipulations required where the batch method is used, and in place of the expensive equipment and the frequent repairs necessary where the usual filter presses are employed, the method of the present invention provides means for purifying liquids of the character specified above in a rapid very efficient manner by the use of extremely simple apparatus which seldom requires repairs and which operates in a very simple and very efficient manner.

This application is a substitution for an application bearing the same title filed July 14, 1922, under Serial No. 574,868.

What I claim is:

1. The method of treating a liquid containing adsorbable material, which comprises the steps of circulating a quantity of said liquid in the presence of an adsorbent, vigorously agitating said liquid in the presence of said adsorbent during the course of such circulation in such a manner as to effect an increase of concentration of said adsorbent in one portion of said liquid and a decrease of concentration of said adsorbent in another portion of said liquid, and adding further increments of liquid to be treated to said first mentioned quantity of liquid while withdrawing portions of liquid substantially free from adsorbable material from the portion of said liquid having the decreased concentration of adsorbent.

2. The method of treating a liquid containing adsorbable material, which comprises the steps of circulating a quantity of said liquid in the presence of an adsorbent in a substantially closed pressure system provided with an inlet for further liquid to be treated and with an outlet for treated liquid, vigorously agitating said liquid in the presence of said adsorbent during the course of such circulation in such a manner as to effect an increase of concentration of said adsorbent in one portion of said liquid and a decrease of concentration of said adsorbent in another portion of said liquid, and adding further increments of liquid to be treated to said first-mentioned quantity of liquid while withdrawing portions of liquid substantially free from adsorbable material from the portion of said liquid having the decreased concentration of adsorbent.

3. The method of treating a liquid containing adsorbable material, which comprises the steps of adding to a portion only of such liquid substantially all of the adsorbent material intended to treat the entire amount of such liquid, circulating said portion of liquid in the presence of said adsorbent, vigorously agitating a part at least of said portion of liquid in the presence of said adsorbent in such a manner as to effect an increase of concentration of said adsorbent in one portion of said liquid and decrease a concentration of said adsorbent in another portion of said liquid, and adding to such portion of said liquid further increments of liquid to be treated while withdrawing portions of liquid substantially free from adsorbable material from the portion of said liquid having the decreased concentration of adsorbent.

4. The method of treating a liquid containing adsorbable material and an adsorbent, which comprises effecting a smaller concentration of adsorbent in one portion of said liquid than in another portion of the same, and withdrawing from said portion of liquid having the smaller concentration of adsorbent increments of liquid substantially free from adsorbable material.

5. The method of treating a liquid containing adsorbable material and an adsorbent, which comprises vigorously agitating said liquid to effect a smaller concentration of adsorbent in one portion of said liquid than in another portion of the same, and withdrawing from said portion of liquid having the smaller concentration of adsorbent increments of liquid substantially free from adsorbable material.

6. The method of treating a liquid containing adsorbable material and an adsorbent, which comprises imparting a rotative motion to said liquid to effect by centrifugal action a smaller concentration of adsorbent in one portion of the said liquid than in another portion of the same, and withdrawing from said portion of liquid having the smaller concentration of absorbent increments of liquid substantially free from adsorbable material.

7. The method of treating a liquid containing adsorbable material and an adsorbent, which comprises effecting a smaller concentration of adsorbent in one portion of said liquid than in another portion of the same, adding further quantities of liquid containing adsorbable material to said liquid being treated, and withdrawing from said portion of liquid having the smaller concentration of adsorbent increments of liquid substantially free from adsorbable material.

8. The method of treating a liquid containing adsorbable material and an adsorbent, which comprises vigorously agitating said liquid to effect a smaller concentration of adsorbent in one portion of said liquid than in another portion of the same, adding further quantities of liquid containing adsorbable material to said liquid being treated, and withdrawing from said portion of liquid having the smaller concentration of adsorbent increments of liquid substantially free from adsorbable material.

9. The method of treating a liquid containing adsorbable material and an adsorbent, which comprises imparting a rotative motion to said liquid to effect by centrifugal action a smaller concentration of adsorbent in one portion of said liquid than in another portion of the same, adding further quantities of liquid containing adsorbable material to said liquid being treated, and withdrawing from said portion of liquid having the smaller concentration of adsorbent increments of liquid substantially free from adsorbable material.

In testimony, whereof, I have signed my name to this specification this 9th day of April, 1926.

JOHN J. NAUGLE.